United States Patent
Hosaka et al.

(10) Patent No.: US 8,663,833 B2
(45) Date of Patent: Mar. 4, 2014

(54) BIPOLAR SECONDARY BATTERY, BATTERY ASSEMBLY FORMED BY CONNECTING SAID BATTERIES AND VEHICLE MOUNTING SAME

(75) Inventors: Kenji Hosaka, Kanagawa (JP); Hideaki Horie, Yokosuka (JP); Yamamura Yuichiro, Yokosuka (JP); Yasuhiro Yanagihara, Yokohama (JP); Osamu Shimamura, Yokohama (JP); Yoshio Shimoida, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1054 days.

(21) Appl. No.: 12/262,350

(22) Filed: Oct. 31, 2008

(65) Prior Publication Data

US 2009/0117456 A1     May 7, 2009

(30) Foreign Application Priority Data

Nov. 1, 2007  (JP) ................................ 2007-285498
Jun. 18, 2008  (JP) ................................ 2008-159389

(51) Int. Cl.
    *H01M 6/46*    (2006.01)
    *H01M 6/48*    (2006.01)

(52) U.S. Cl.
    USPC .......................................... 429/152; 429/210

(58) Field of Classification Search
    USPC .................................................. 429/152, 210
    See application file for complete search history.

(56) References Cited

U.S. PATENT DOCUMENTS

| | | | |
|---|---|---|---|
| 7,007,504 B2 * | 3/2006 | Kang | ................................ 62/507 |
| 2004/0038124 A1 * | 2/2004 | Hisamitsu et al. | ............ 429/161 |
| 2004/0161667 A1 | 8/2004 | Fukuzawa et al. | |

FOREIGN PATENT DOCUMENTS

| | | |
|---|---|---|
| CN | 1494178 A | 5/2004 |
| CN | 1845360 A | 10/2006 |
| JP | 2006-073772 | 3/2006 |
| JP | 2006-185662 | 7/2006 |
| JP | 2007-122977 A | 5/2007 |
| JP | 2007 213990 A | 8/2007 |
| JP | 2007-213990 A | 8/2007 |
| JP | 2007-242593 A | 9/2007 |
| JP | 2008-159570 A | 7/2008 |
| JP | 2008 159570 A | 7/2008 |
| WO | 03/098717 A | 11/2003 |
| WO | 03/098717 A2 | 11/2003 |
| WO | 2007/082863 A1 | 7/2007 |
| WO | 2007/826863 A | 7/2007 |

* cited by examiner

*Primary Examiner* — Joseph Kosack
(74) *Attorney, Agent, or Firm* — Young Basile

(57) ABSTRACT

Embodiments of a battery taught herein are directed to preventing a displacement between bipolar battery stacks or between a bipolar battery stack and an electrode tab. A bonding portion is formed at a part of a contact surface where a collector positioned at both ends in a stacking direction of a bipolar battery stack is bonded to the electrode tabs. The electrode tab and the collector are fixed by such a bonding portion. Further, the bonding portion is formed at a part of a contact surface where adjacent bipolar battery stacks are bonded to each other. Bipolar batteries positioned at upper and lower portions in the stacking direction are fixed by such a bonding portion.

15 Claims, 12 Drawing Sheets

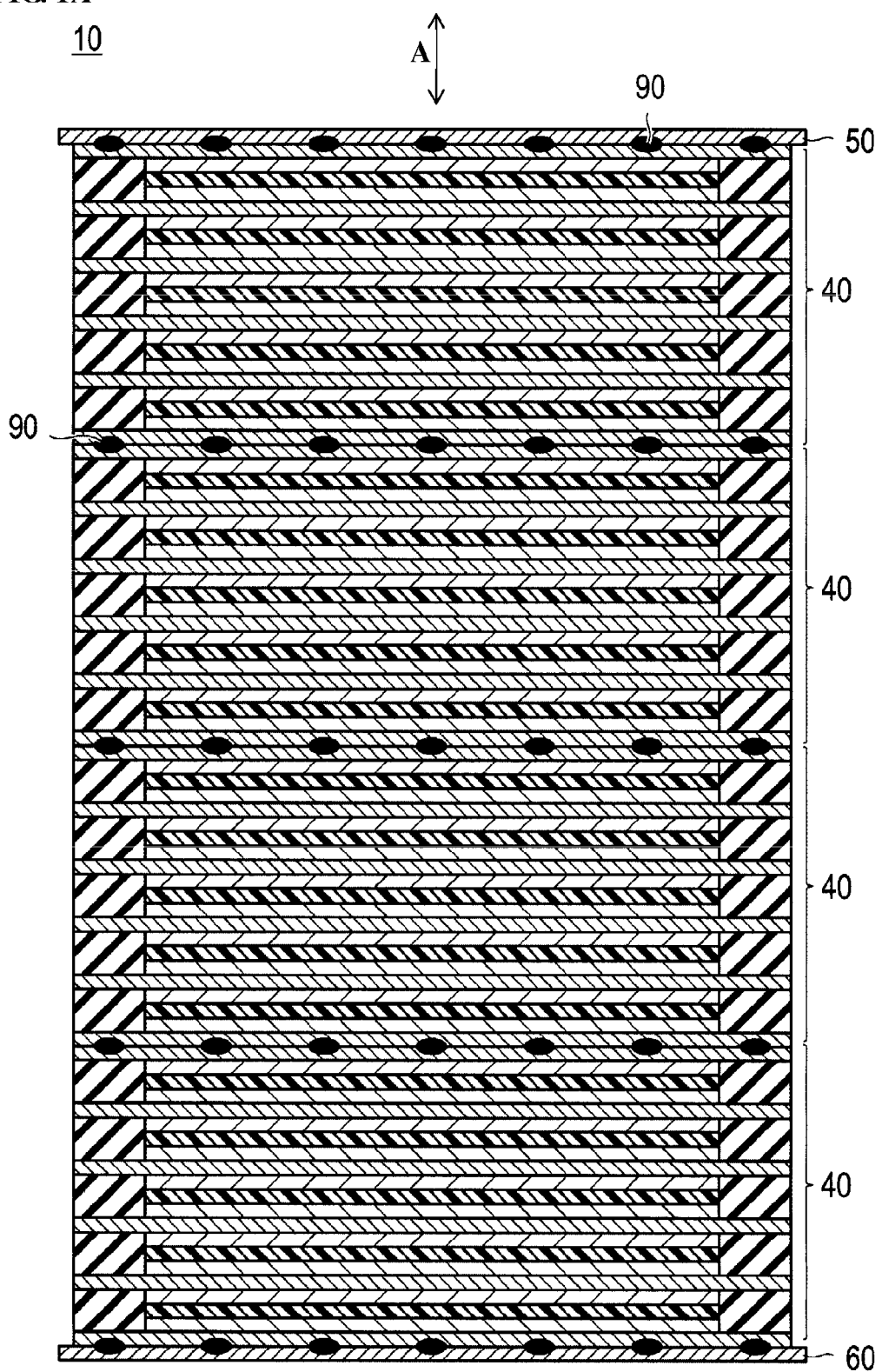

Cathode surface

Anode surface

US 8,663,833 B2

BIPOLAR SECONDARY BATTERY, BATTERY ASSEMBLY FORMED BY CONNECTING SAID BATTERIES AND VEHICLE MOUNTING SAME

CROSS-REFERENCE TO RELATED APPLICATIONS

This application claims priority from Japanese Patent Application Serial Nos. 2007-285498, filed Nov. 1, 2007, and 2008-159389, filed Jun. 18, 2008, each of which is incorporated herein in its entirety by reference.

TECHNICAL FIELD

The invention relates to a bipolar secondary battery, a battery assembly formed by connecting a plurality of the bipolar secondary batteries and a vehicle mounting the same.

BACKGROUND

Recently, there has been an increased concern about protecting the environment. Thus, carbon dioxide emissions have been reduced in various industries. In the automobile industry, the early introduction of Hybrid Electric Vehicles (HEV), Electric Vehicles (EV) and fuel cell vehicles seeks to reduce carbon dioxide emissions. To introduce such vehicles at an earlier stage, a high performance secondary battery must be developed. In recent years, the focus has been directed to a stack-type bipolar secondary battery, which can achieve high energy. High output densities have been contemplated for the secondary battery.

A conventional bipolar secondary battery includes a battery element, wherein a plurality of bipolar electrodes are stacked using an electrolyte layer interposed therebetween. Such a battery also includes an outer material for surrounding and sealing the entire battery element, as well as a terminal projecting from the outer material to the outside for extracting a current. The bipolar electrode forms a cathode by forming a cathode active material layer at one surface of a collector and an anode by forming an anode active material layer at the other surface of the collector. Further, a unit cell layer is formed by sequentially stacking the cathode active material layer, the electrolyte layer and the anode active material layer. Such a unit cell layer is inserted between a pair of the collectors. As for a bipolar battery stack, since the current flows along a direction of stacking the bipolar electrodes in the battery element (i.e., a thickness direction of the battery), a path of the current is short. Thus, current loss is low.

Japanese Laid-Open Patent Publication No. 2006-073772 ("Patent Document 1") discloses a laminate bipolar secondary battery as an example of the bipolar secondary battery. According to the bipolar secondary battery disclosed therein, an end plate is positioned at both end surfaces in a stacking direction of the bipolar secondary battery. Further, the bipolar secondary battery is pressed by such end plate from the stacking direction of the bipolar secondary battery. By pressing the bipolar secondary battery as above, there can be obtained a bipolar secondary battery with high energy density and high output density.

BRIEF SUMMARY

Embodiments of the invention to provide a bipolar secondary battery that can prevent a displacement between the stacked bipolar battery stacks or between the bipolar battery stack and the electrode tab. The invention also seeks to provide a battery assembly stacking a plurality of the bipolar secondary batteries. Further, the invention relates to a vehicle configured to mount the battery or the battery assembly.

One embodiment of a bipolar secondary battery described herein comprises a bipolar battery stack including at least one electrolyte layer and at least one bipolar electrode alternately stacked, each bipolar electrode comprising a cathode formed at a first side of a collector and an anode formed at an opposite side of the collector. An electrode tab is disposed in a respective collector positioned at opposing ends of the bipolar battery stack in a stacking direction of the bipolar battery stack.

Each electrode tab can be fixedly bonded to the bipolar battery stack at a bonding portion disposed at a contact surface between the electrode tab and the bipolar battery stack. Also, a bonding portion can be formed at a contact surface where the adjacent bipolar secondary batteries are bonded to each other.

A battery assembly according to embodiments of the invention may be obtained by electrically connecting the bipolar secondary batteries to one another.

A vehicle according to the invention may be provided with the bipolar secondary battery or battery assembly as a power source for driving.

BRIEF DESCRIPTION OF THE DRAWINGS

The description herein makes reference to the accompanying drawings wherein like reference numerals refer to like parts throughout the several views, and wherein:

FIG. 1A is a cross-sectional view of a bipolar secondary battery in accordance with a first embodiment of the invention;

DETAILED DESCRIPTION OF EMBODIMENTS OF THE INVENTION

Figure 1B:
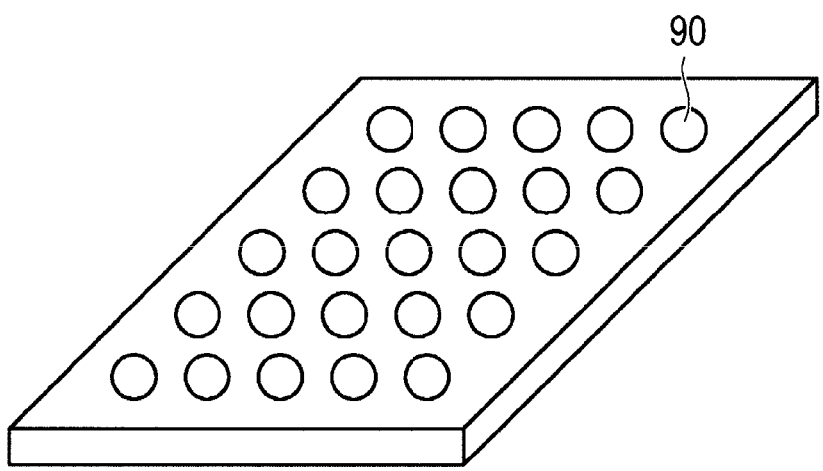
FIG. 1B shows a bonding portion of the bipolar secondary battery shown in FIG. 1A.

When a known bipolar secondary battery is mounted on a vehicle, which is subject to a significant amount of vibration, a performance of that battery may deteriorate due to vibrations. This is because the vibration from a road surface or power source may cause a displacement between the stacked bipolar battery stacks, which form the bipolar secondary battery, or between the bipolar battery stack and the bipolar electrode. If such a displacement occurs, an inner resistance within the bipolar secondary battery is increased. Thus, the performance of the bipolar secondary battery is deteriorated, i.e., an amount of power is decreased.

Further, when mounting the above battery on a vehicle, it is necessary to form the bipolar secondary battery by estimating the deterioration in the performance of the bipolar secondary battery. This results in stacking more bipolar secondary stacks than would otherwise be required.

In contrast, taught herein are embodiments of a bipolar secondary battery with superior anti-vibration properties obtained by bonding a plurality of bipolar battery stacks, which constitute a bipolar secondary battery, along a stacking direction and/or bonding the bipolar battery stack and the electrode tab. Even if such a bipolar secondary battery is used when vibrations exist, it is possible to suppress the displacement between the bipolar battery stacks or between the bipolar battery stack and the electrode tab. Thus, it is possible to prevent an increase of resistance occurring from the displacement.

Further, since weight and volume of the bipolar secondary battery may be suppressed, it is possible to provide the bipolar secondary battery with a high output density.

Hereinafter, embodiments of a bipolar secondary battery of the invention are described in detail. A thickness or shape of each layer for forming the bipolar secondary battery is exaggerated or emphasized in the provided drawings in order to facilitate the understanding of the present invention. Such layers shown in the drawings do not conform to the actual constitution of the bipolar secondary battery.

The first embodiment of the invention is described with reference to FIG. 1A to FIG. 6.

Figure 2:
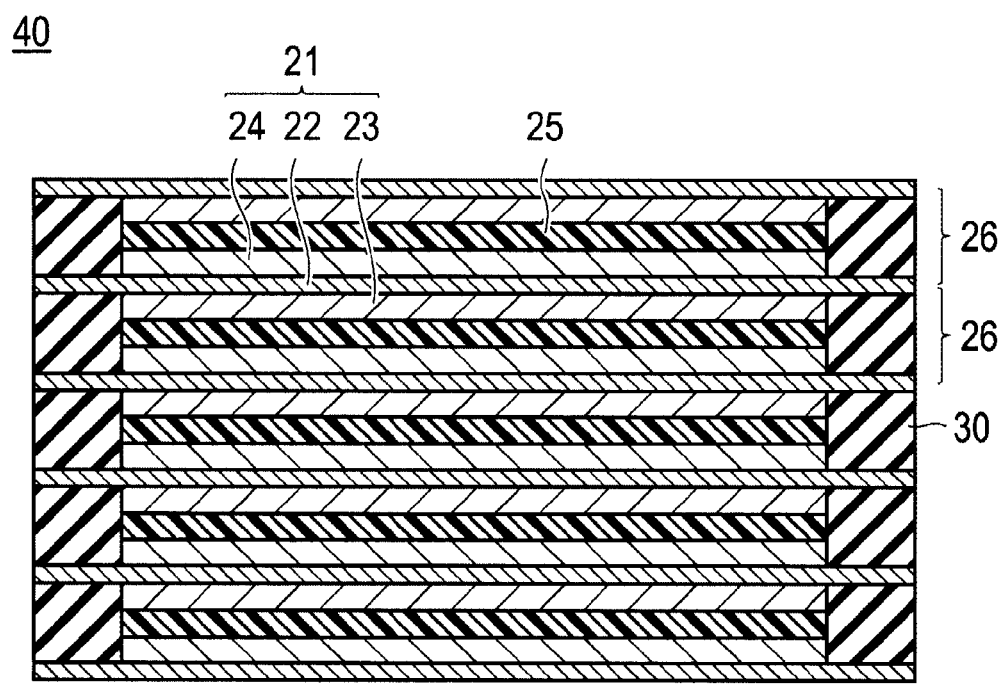
FIG. 2 is a cross-sectional view of a bipolar battery stack for forming the bipolar secondary battery shown in FIG. 1.

A bipolar secondary battery 10 shown in FIG. 1A is formed by stacking a plurality of bipolar battery stacks 40 (four bipolar battery stacks in FIG. 1A) shown in FIG. 2. A pair of electrode tabs 50 and 60 is disposed at opposite end surfaces in a stacking direction of the bipolar secondary battery 10 such that a plurality of the bipolar battery stacks 40 is inserted between both end surfaces.

As shown in FIG. 1B, a bonding portion 90 is formed between the bipolar battery stacks 40 and also between the bipolar battery stack 40 and the electrode tabs 50 and 60, wherein an adhesive with a dot shape is applied regularly over the entire surface of the bonding portion 90. The bipolar battery stack 40 and the electrode tabs 50 and 60 are bonded to each other by such a bonding portion 90. FIG. 1A illustrates a configuration wherein the bipolar secondary battery 10 is formed by stacking a plurality of the bipolar battery stacks 40. However, the bipolar secondary battery 10 may be formed from one bipolar battery stack 40.

As shown in FIG. 2, the bipolar battery stack 40 is formed by stacking a plurality of the bipolar electrodes 21, which includes a collector 22, a cathode active material layer 23 and an anode active material layer 24, with an electrolyte layer 25 interposed therebetween. A battery element 20 (shown in FIG. 4) includes the cathode active material layer 23, the electrolyte layer 25 and the anode active material layer to form a unit cell layer 26 by disposing the collector 22 at both end surfaces in a stacking direction of the battery element 20. A sealing portion 30 for blocking a contact of the battery element 20 with outside air is formed around the battery element 20 for constituting each unit cell layer 26. Although the unit cell layer 26 with five layers is formed in the bipolar battery stack 40 shown in FIG. 2, the number of layers may be optionally selected.

In the first embodiment, four bipolar battery stacks 40 are stacked along a direction of stacking the bipolar electrodes 21 (an up-down direction in FIG. 1A) and are electrically connected in series, thereby constituting the bipolar secondary battery 10. A plurality of the bipolar battery stacks 40 are inserted between a pair of electrode tabs 50 and 60 and are then vacuum-sealed using an outer material to form the bipolar secondary battery 10. The electrode tab 50 shown at an upper side of FIG. 1A is connected with a cathode terminal for electrically connecting a cathode side of the uppermost bipolar battery stack 40. Further, the electrode tab 60 shown at a lower side of FIG. 1A is connected with an anode terminal for electrically connecting an anode side of the lowermost bipolar battery stack 40.

Figure 3:
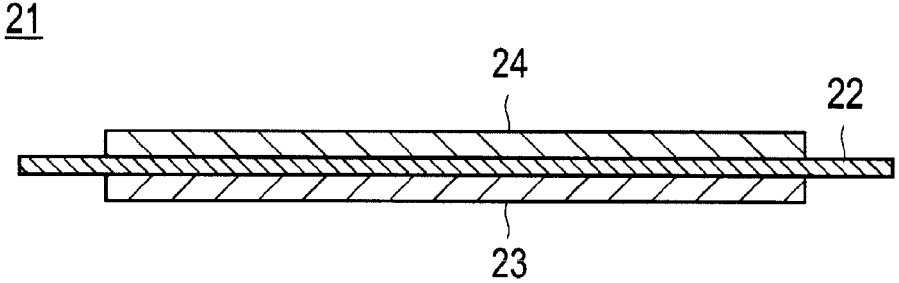
FIG. 3 is a cross-sectional view of a bipolar electrode for forming the bipolar battery stack shown in FIG. 2.
Figure 3:
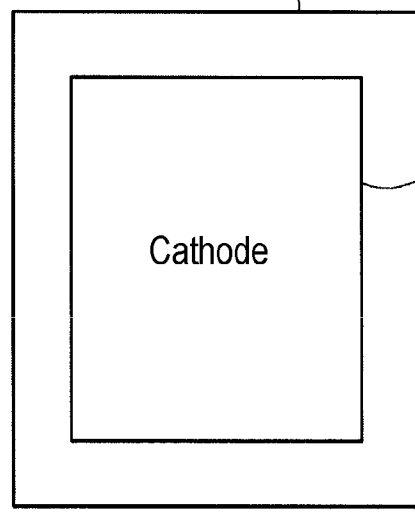
Figure 3:
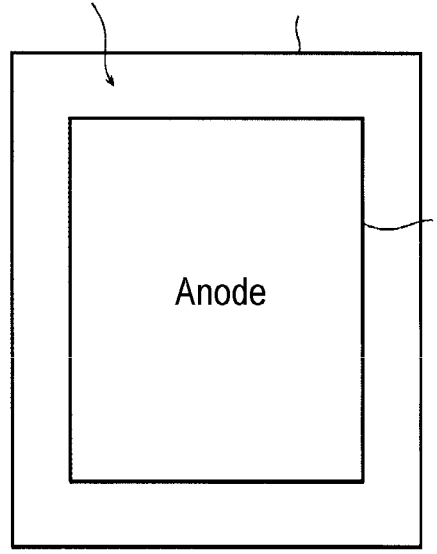

In the bipolar electrode 21, a cathode is formed by arranging the cathode active material layer 23 at one surface of the collector 22 and an anode is formed by arranging the anode active material layer 24 at the other surface of the collector 22 as shown in FIG. 3. A cathode terminal electrode of the battery element 20 is provided with only the cathode active material layer 23 at one surface of the collector 22 and stacked on the uppermost bipolar electrode 21 in FIG. 2 via the electrolyte layer 25 interposed therebetween. An anode terminal electrode of the battery element 20 is provided with only the anode active material layer 24 at one surface of the collector 22 and stacked on the lowermost bipolar electrode 21 in FIG. 2 via the electrolyte layer interposed therebetween. The bipolar electrode 21 includes the cathode terminal electrode and the anode terminal electrode.

A material of the collector used in the invention is not specifically limited and may include any conventional material. For example, the material of the collector may include an aluminum foil, a stainless foil (SUS), a clad material of nickel and aluminum, a clad material of copper and aluminum or a plate material of a combination thereof. Further, the collector may be a collector wherein aluminum is coated on a metal surface. Also, if necessary or desired, a collector wherein two or more metallic foils are bonded may be used.

A thickness of the collector is not specifically limited. However, such thickness may be within 1 μm to 100 μm.

The cathode includes the cathode active material. In addition, it may include a conductive auxiliary agent, binder, etc. These agents, binders, etc., are sufficiently impregnated into the cathode and the anode as a gel electrolyte via chemical cross-linking or physical cross-linking operation.

As for the cathode active material, a lithium-transition metal composite oxide, which is also used in a lithium ion battery in a solution class, may be used. Specifically, the oxide may include a Li—Co-based composite oxide such as $LiCoO_2$, a Li—Ni-based composite oxide such as $LiNiO_2$, a Li—Mn-based composite oxide such as $LiMn_2O_4$, and a Li—Fe-based composite oxide such as $LiFeO_2$. Further, it may also include a phosphate compound of a transition metal and lithium such as $LiFePO_4$ or a sulfated compound of a transition metal and lithium, the transition metal oxide or sulfide such as $V_2O_5$, $MnO_2$, $TiS_2$, $MoS_2$, $MoO_3$, etc., or $PbO_2$, $AgO$, $NiOOH$, etc.

In terms of manufacturing process, it is preferred that a particle size of the cathode active material can form a membrane via a spray coat by pasting a cathode material. Further, in order to restrain the electrode resistance of the bipolar battery 10, it is also preferred that the particle size thereof is smaller than the particle size used in a lithium ion battery wherein the electrolyte is a type of solution, not solid. Specifically, according to one embodiment, an average particle size of the cathode active material is within a range from 0.1 µm to 10 µm.

The polymer gel electrolyte includes the electrolytic solution used in a conventional lithium ion battery within the solid polymer electrolyte with ion conductivity. Further, it may include a polymer gel electrolyte retaining such an electrolytic solution within a polymer framework without any lithium ion conductivity.

Here, the electrolytic solution included in the polymer gel electrolyte (electrolytic salt and plasticizer) can be that used in the conventional lithium ion battery. For example, the electrolytic solution may include at least one kind of lithium salt (electrolytic salt) selected from inorganic acid anion salts such as $LiPF_6$, $LiBF_4$, $LiClO_4$, $LiAsF_6$, $LiTaF_6$, $LiAlCl_4$ or $Li_2B_{10}Cl_{10}$, or organic acid anion salts such as $LiCF_3SO_3$, $Li(CF_3SO_2)_2N$ or $Li(C_2F_5SO_2)_2N$ and use an organic solvent (plasticizer) such as a ring-type carbonate class such as propylene carbonate, ethylene carbonate, etc., a chain-type carbonate class such as dimethyl carbonate, methylethyl carbonate, diethyl carbonate, etc., an ether class such as tetrahydrofuran, 2-methyl tetrahydrofuran, 1,4-deoxane, 1,2-dimethoxyethane, 1,2-dibtoxyethane, etc., a lactone class such as γ-butyrolactone, a nitrile class such as acetonitrile, an ester class such as methyl propionate, etc., an amide class such as dimethylformamide, etc. and non-proton solvent mixing at least one or two selected from methyl acetate, methyl formate, etc. However, the electrolytic solution is certainly not limited thereto.

The polymer with ion conductivity may include, for example, polyethylene oxide (PEO), polypropylene oxide (PPO) or a copolymer thereof.

The polymer without lithium ion conductivity used in the polymer gel electrolyte may include, for example, polyvinylidene fluoride (PVDF), polyvinyl chloride (PVC), polyacrylonitile (PAN) and polymethylmethacrylate (PMMA), although it is certainly not limited thereto. Further, since PAN and PMMA belong to a polymer with little ion conductivity, they may serve as the polymer with ion conductivity. However, they are exemplified herein as the polymer without lithium ion conductivity used in the polymer gel electrolyte.

The lithium salt may, for example, comprise inorganic acid anion salts such as $LiPF_6$, $LiBF_4$, $LiClO_4$, $LiAsF_6$, $LiTaF_6$, $LiAlCl_4$ or $Li_2B_{10}Cl_{10}$, organic acid anion salts such as $Li(CF_3SO_2)_2N$ or $Li(C_2F_5SO_2)_2N$ or a mixture thereof, although it is certainly not limited thereto.

Further, the conductive auxiliary agent may, for example, include acetylene black, carbon black or graphite, although it is certainly not limited thereto.

In the present embodiment, a pre-gel solution is prepared by mixing the electrolytic solution, the lithium salt and the polymer. Further, the pre-gel solution is impregnated into the cathode and the anode.

A blending amount of the cathode active material, the conductive auxiliary agent and the binder should be determined by considering the purpose of use (e.g., emphasis on power or energy) or the ion conductivity. For example, when a blending amount of the electrolyte within the cathode (particularly the solid polymer electrolyte) is excessively small, the ion conductive resistance or ion diffusing resistance within the active material layer becomes high so that the battery performance is deteriorated. Meanwhile, when the blending amount of the electrolyte within the cathode (particularly the solid polymer electrolyte) is excessively large, the energy density of the battery is deteriorated. Thus, the amount of the solid polymer electrolyte for accomplishing the object is determined by considering the above.

A thickness of the cathode is certainly not limited to the above. Rather, it should be determined by considering the purpose of use (e.g., emphasis on power or energy) or the ion conductivity, as discussed above in relation to the blending amount. A thickness of the general cathode active material layer falls within a range from 10 to 500 µm in certain embodiments.

The anode includes an anode active material. In addition, it may include a conductive auxiliary agent, binder, etc. Except for the type of anode active material, other features of the anode are substantially identical as discussed above. Thus, explanations thereof are omitted herein.

As for the anode active material, the anode active material used in the lithium ion battery in the solution class may be used. In certain embodiments, the anode active material is metallic oxide, lithium-metallic composite oxide metal and carbon. More preferably, the anode active material is carbon, transition metallic oxide and lithium-transition metal composite oxide. In other preferred embodiments, the anode active material is titanium oxide, lithium-titanium composite oxide and carbon. A single independent material or two or more materials may be used for the anode active material.

In the present embodiment, the cathode active material layer uses the lithium-transition metal composite oxide as a cathode active material and the anode active material layer uses the carbon or lithium-transition metal composite oxide as an anode active material. By doing so, the battery with superior capacity and power can be manufactured.

The electrolyte layer is a layer formed from a polymer with ion conductivity. A material of the electrolyte layer should not be limited so long as the material has ion conductivity.

The electrolyte of the present embodiment is the polymer gel electrolyte. As explained above, the polymer gel electrolyte is prepared via a chemical cross-linking or physical cross-linking operation after impregnating the pre-gel solution into the separator as a base.

Such a polymer gel electrolyte is prepared by including the electrolytic solution used in the conventional lithium ion battery within an all-solid polymer electrolyte with ion conductivity such as polyethylene oxide (PEO). Further, the polymer gel electrolyte may include a polymer gel electrolyte retaining such an electrolytic solution within a polymer framework without any lithium ion conductivity such as polyvinylidene fluoride (PVDF). The above polymer gel electrolytes are identical to the polymer gel electrolyte explained above, so explanations thereof are omitted. As for a ratio of the polymer and the electrolytic solution constituting the polymer gel electrolyte, when the polymer of 100% is set as the total solid polymer electrolyte and the electrolytic solution of 100% is set as the liquid electrolyte, the electrolyte between such ratios corresponds to the polymer gel electrolyte. Also, the polymer electrolyte includes both the polymer gel electrolyte and the total solid polymer electrolyte. Further, an inorganic solid electrolyte with ion conductivity such as ceramic corresponds to the total solid polymer electrolyte.

In addition to the polymer electrolyte constituting the battery, the polymer gel electrolyte may be included within the cathode or anode. However, depending on the polymer electrolyte constituting the battery, the cathode and the anode, different polymer electrolytes or a same polymer electrolyte may be used. Further, depending on the layer, different polymer electrolytes may be used.

Here, the solid electrolyte includes all of the polymer gel electrolyte, the solid polymer electrolyte and the inorganic solid electrolyte.

A thickness of the electrolyte constituting the battery is not specifically limited. However, in order to obtain a compact bipolar battery, it is preferred that the thickness of the electrolyte is as thin as possible within a range for securing a function of the electrolyte. The thickness of a general solid polymer electrolyte layer is, for example, within a range from 10 to 100 μm. However, as for the shape of the electrolyte, by using the manufacturing process, it is easy to form the shape to coat the upper surface of the electrode (cathode or anode) as well as the side outer peripheral portion thereof. Also, in terms of function and performance, it is not necessary to set the constant thickness every time regardless of the region.

Since the solid electrolyte is used as the electrolyte layer of the bipolar secondary battery, it is possible to prevent liquid leakage by using the solid electrolyte to thereby prevent a liquid junction (a particular problem of the bipolar battery). This provides the bipolar battery with high reliability. Further, since there is no liquid leakage, the constitution of the sealing portion 30 can be made simpler. Thus, it is possible to easily prepare the bipolar battery. Also, the reliability of the bipolar battery stack can be increased.

The solid electrolyte may include a conventional solid polymer electrolyte such as PEO (polyethylene oxide), PPO (polypropylene oxide) or a copolymer thereof. The solid polymer electrolyte layer includes a support salt (lithium salt) for securing the ion conductivity. The support salt may include $LiBF_4$, $LiPF_6$, $LiN(SO_2CF_3)_2$, $LiN(SO_2C_2F_5)_2$ or a combination thereof. However, it should be noted that embodiments of the invention are certainly not limited to this configuration. The polyalkylene oxide-based copolymer such as PEO and PPO can fully melt the lithium salt such as $LiBF_4$, $LiPF_6$, $LiN(SO_2CF_3)_2$ and $LiN(SO_2C_2F_5)_2$. Also, superior mechanical strength can be obtained by forming the cross-linking structure.

Figure 4:
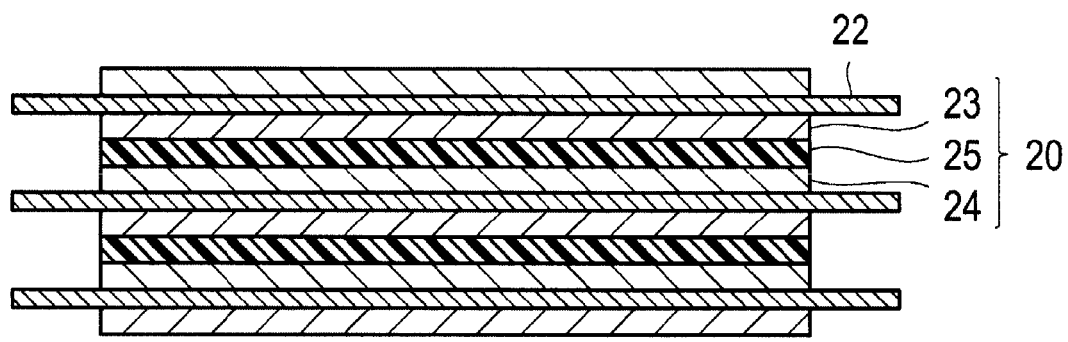
FIG. 4 shows a unit cell layer provided in the bipolar battery stack shown in FIG. 2.

As shown in FIG. 4, the battery element 20 is constituted by stacking the cathode active material layer 23, the electrolyte layer 25 and the anode active material layer 24. The battery element 20 is inserted between the collectors 22 adjacent to each other. The electrolyte layer 25 may be formed by impregnating the material of the electrolyte with a porous cathode and anode or retaining the electrolyte in a separator 25a (see FIG. 6), which comprises the base.

As shown in FIG. 2, the sealing portion 30 is formed on the outer peripheral portion of the unit cell layer 26, and a contact of the battery element 20 shown in FIG. 4 with outside air is blocked so as not to decrease the ion conductivity of the electrolyte. The electrolyte includes the liquid gel electrolyte or semi-solid gel electrolyte as well as the solid electrolyte. The formation of the sealing portion 30 prevents the air or moisture in the air from reacting with the active materials. Further, a liquid junction caused by liquid leakage, which may occur when using the liquid or semi-liquid gel electrolyte, is prevented.

Figure 5:
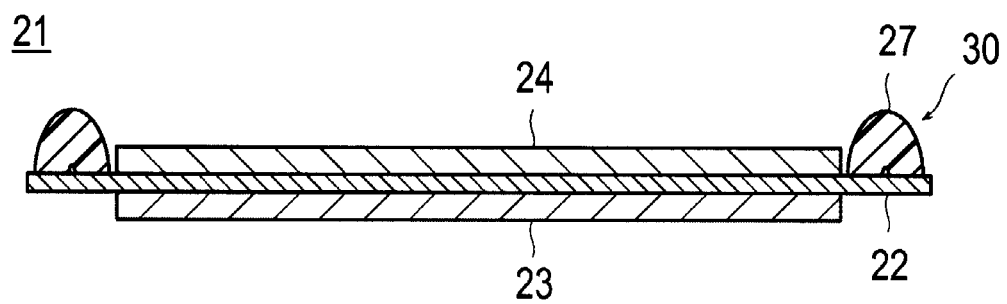
FIG. 5 illustrates a configuration wherein a seal precursor is arranged at an outer peripheral portion of the bipolar electrode shown in FIG. 3.
Figure 5:
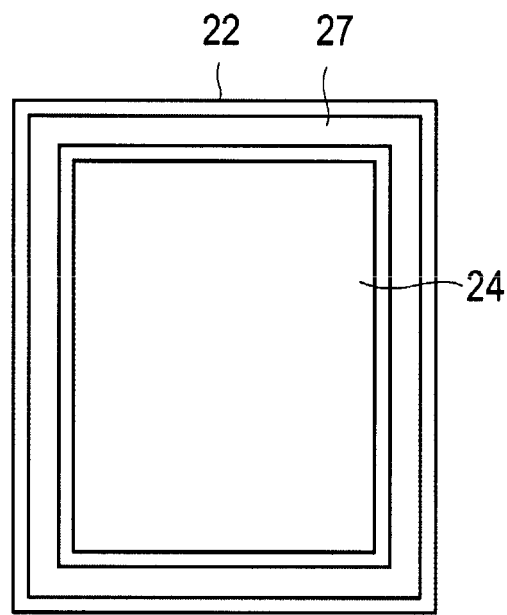
Figure 6:
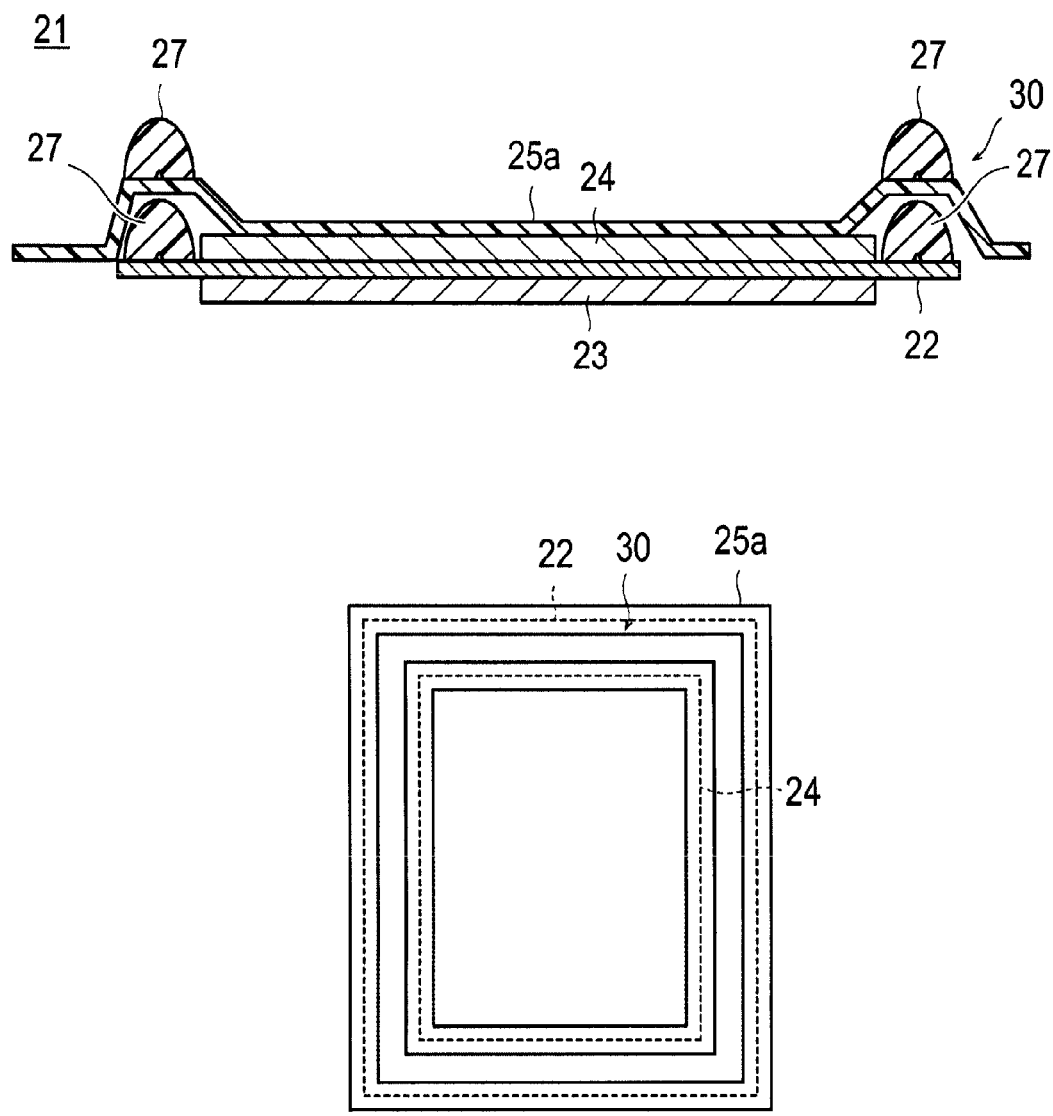
FIG. 6 illustrates a configuration wherein a separator is disposed on the bipolar electrode having the seal precursor, and wherein the seal precursor is arranged at an outer peripheral portion of the electrode.

As shown in FIGS. 5 and 6, the sealing portion 30 is formed by stacking a plurality of the bipolar electrodes 21 having a seal precursor 27 and a separator 25a. More specifically, as shown in FIG. 5, the seal precursor 27 is disposed at an outer peripheral portion of the anode 24 on the collector 22 of the bipolar electrode 21. Thereafter, as shown in FIG. 6, the separator 25a is disposed so as to cover the bipolar electrode 21. Further, another seal precursor 27 is disposed at an upper portion of the separator 25a at the same position as the seal precursor 27. The bipolar battery structure is prepared wherein the unit cell layer 26 is stacked by stacking a plurality of the bipolar electrodes with the seal precursors 27 disposed on the upper and lower portions of the separator 25a. Although five layers of the unit cell layer are stacked by overlapping six sheets of the bipolar electrodes in FIG. 2, the number of layers may be optionally selected. The sealing portion 30 is formed by compressing the bipolar battery structure with a thermal presser and then grinding and curing the seal precursor 27 to thereby prepare the bipolar battery stack 40. The electrolyte is not leaked from the unit cell layer 26 to the outside by the sealing portion 30, and the contact of the unit cell layer 26 with the outside air is blocked. Further, it is preferred, though not necessary, that the sealing portion 30 penetrates through the separator 25a or covers the entire circumference of a side surface of the separator 25a. This is because the contact of the unit cell layer 26 with the outside air can be securely blocked by an inner portion of the separator 25a.

Although the cathode active material layer or anode active material layer is disposed at an uppermost or lowermost surface of the bipolar battery structure, the cathode active material or anode active material is removed from the bipolar battery structure disposed at the uppermost or lowermost surface. FIGS. 5 and 6 show the configuration wherein the seal precursor 27 and the separator 25a are disposed at the outer peripheral portion of the anode. However, the sealing portion may be formed with the cathode active material layer in place of the anode active material layer 24.

The seal precursor may, for example, include a rubber-base resin adhesive joined to the collector 22 via a press-deforming operation or a thermally fusible resin such as a resin in olefin-base adhesive joined to the collector 22 via thermal fusion by heating and pressing.

The seal precursor may use the rubber-base resin. The rubber-base sealing portion 30 using the rubber-base resin can block the contact of the unit cell layer 26 with the outside air by using an elasticity of the rubber-base resin. Further, even when the stress resulting from vibrations or impacts is repeatedly exerted on the bipolar battery stack 40, since the rubber-base sealing portion 30 can be easily adjust in response to a twist or deformation of the bipolar battery stack 40, a sealing effect can be retained. Further, a manufacturing process of the battery becomes simplified since it is not necessary to execute thermal fusion. The rubber-base resin is not specifically limited. In certain preferred embodiments, the rubber-base resin is selected from a group consisting of silicon-base rubber, fluorine-base rubber, olefin-base rubber and nitrile-base rubber. These rubber-base resins are superior in terms of sealing property, alkali resistance, chemical resistance, durability/weatherability, heat resistance, etc. Thus, the rubber-base resins can be retained for a long time under the use environment without deteriorating in performance and quality. This is because the blockage of the contact of the unit cell layer 26 with the outside air, i.e., the sealing of the unit cell layer 26, can be effectively executed for a long time. However, the rubber-base resin is not limited to the above examples.

If the battery element 20 wherein the electrolyte layer 25 and two sheets of the bipolar electrodes 21 are stacked is pressed and heated from both sides along the stacking direction, then the thermal fusion resin-base sealing portion using the thermally fusible resin can block the contact of the unit cell layer 26 with the outside air by thermal fusion. The thermally fusible resin is not specifically limited as long as the thermally fusible resin exhibits a superior sealing effect as the sealing portion under circumstances of use of the bipolar battery stack 40. The thermally fusible resin can be, for example, selected from a group consisting of silicon, epoxy, urethane, polybutadiene, olefin-base resin (polypropylene, polyethylene, etc.) and paraffin wax. These thermally fusible resins are superior in terms of sealing property, alkali resistance, chemical resistance, durability/weatherability, heat resistance, etc. Thus, the thermally fusible resins can be retained for a long time under the use environment without deteriorating performance and quality. This is because the blockage of the contact of the unit cell layer 26 with the outside air, that is, the sealing of the unit cell layer 26, can be effectively maintained for a long time. However, the thermally fusible resin is not limited to the above examples. A resin for improving adhesion with the collector 22, for example, modified polypropylene, is preferable. Further, the temperature at the time of heating may be within a range that is higher than a thermal fusion temperature of the thermally fusible resin and does not affect other battery components. This temperature may be appropriately selected depending on the types of thermally fusible resins. For example, a temperature of about 200° C. is appropriate for the modified polypropylene. A pressing point and a heating point are the same as in the rubber-based sealing portion 30.

The sealing portion 30 may be formed from a three-layered film disposing a non-fused layer between fused layers.

As shown in FIG. 2, the size of the sealing portion 30 is not necessarily limited to align with an end of the collector 22. Rather, it may be sized so as to project from the end of the collector 22 in the surface direction. This is so an inner short by a contact of outer peripheral portions of the collector 22 can be securely prevented.

The sealing portion may be separated from the electrolyte layer so as to be arranged around the circumference of the unit cell layer. However, in such a case, a stacking operation of the electrolyte layer is executed separately from a stacking operation of the sealing portion at the time of manufacturing the battery. The manufacturing process may be more complicated. As to the present embodiment, since the sealing portion 30 is formed on the electrolyte layer 25, the stacking operation of the electrolyte layer 25 can be executed along with the stacking operation of the sealing portion 30 at the time of manufacturing the battery. Since the manufacturing process of the battery is not complicated, the product costs are not increased.

The separator 25a may include a microporous membrane separator and a non-woven fabric separator.

The microporous separator may, for example, include a porous sheet comprising a polymer that can absorb and retain the electrolyte. A material of the polymer may include, for example, a polyethylene (PE), polypropylene (PP), a stack in a three-layer structure of PP/PE/PP and/or polyimide.

The non-woven fabric separator may include, for example, a sheet made by weaving fibers. Further, the non-woven fabric separator may include a span bond obtained by fusing the fibers via heating. The non-woven fabric is not limited as long as it has a sheet shape made by arranging the fibers in a web (thin cotton) or a matte shape in an appropriate manner to thereby bond the fibers with a proper adhesive or fusing force of the fiber itself. The material of the fiber is not specifically limited, but may include, for example, cotton, rayon, acetate, nylon, polyester, polypropylene, polyethylene, polyolefin, polyimide, aramide, etc. A single material or combination thereof is used depending on the intended use (e.g., to obtain a mechanical strength required for the electrolyte layer 25).

The shape of the sealing precursor arranged at the outer peripheral portion of the separator 25a is not specifically limited as long as the sealing precursor can effectively exhibit the effects of sealing. For example, the sealing precursor may be arranged to have a rectangular shape, a shape having a cross-section in a semi-circle or ellipse, etc.

As shown in FIG. 1A, the bonding portion 90 may bond the bipolar battery stacks 40 to each other or bond the bipolar battery stack 40 and the electrode tabs 50 and 60. Unlike the conventional technique without bonding, the bipolar battery stack with bonding portion 90 reduces or eliminates the displacement between the bipolar battery stacks 40 or between the bipolar battery stack 40 and the electrode tabs 50 and 60. Thus, an electrical resistance increase otherwise resulting from displacement can be prevented. In order to improve the battery performance, the bonding portion 90 is configured and arranged so as not to cover over an entire contact surface between the bipolar battery stacks 40 or between the bipolar batter stack 40 and the electrode tabs 50 and 60. Here, as shown in FIG. 1B, the bonding portion 90 does not include the entire contact surface where the bipolar battery stacks 40 contact. Rather, the bonding portion 90 is a portion of the contact surface where the battery stacks 40 contact. Likewise, both the bipolar battery stack 40 and the electrode tabs 50 and 60 are not bonded to the entire contact surface where the bipolar battery stack 40 and the electrode tabs 50 and 60 contact each other. Rather, they are bonded to a part of the contact surface. Although an adhesive with a high electrical insulating property (e.g., epoxy resin-based adhesive) is used for bonding, the current flows because non-bonding portions where the adhesive is not applied between the bipolar battery stacks 40 and between the bipolar battery stack 40 and the electrode tabs 50 and 60 are electrically contacted. This is because the adhesive for bonding the bipolar battery stacks 40 to each other and the bipolar battery stack 40 and the electrode tabs 50 and 60 contain minute irregularities on the contacting surface. Thus, there exist many contacting points between the contact surfaces. More specifically, as for the battery element 20 of the bipolar battery stack 40, an excellent output density may be obtained when the bonding portion 90 is formed at an area of 5 to 80% of a surface area of the bipolar battery stack 40 (more specifically, 5 to 30% thereof).

The bonding portion 90 shown in FIG. 1B is formed between each bipolar battery stack 40 to fix the bipolar battery stacks 40. The bonding portion 90 is formed with a pattern below the surface of the collector 22 at the outermost layer of the bipolar battery stack 40. Here, the bonding portion 90 is formed in only a part of the contact surface, not in the entire surface of the contact surface.

Figure 7:
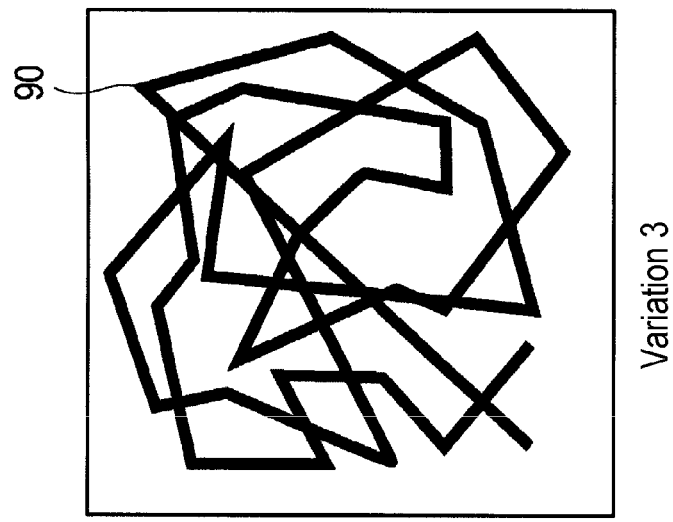
FIG. 7 shows a bonding pattern in accordance with the first embodiment of the invention.
Figure 7:
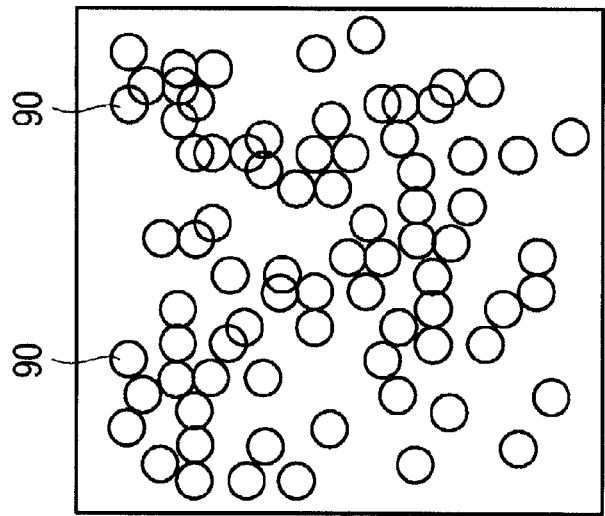
Figure 7:
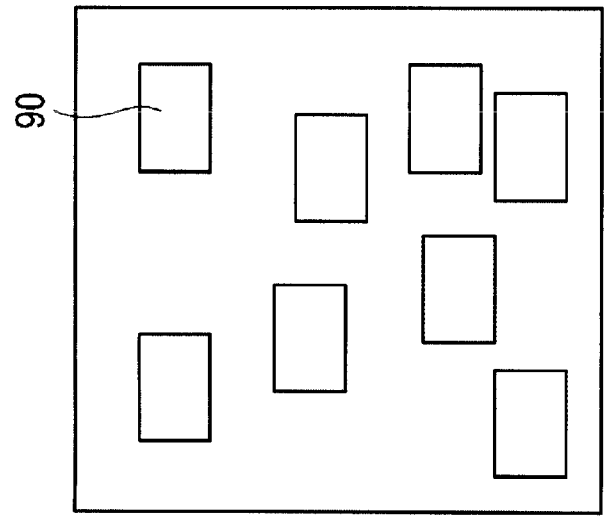

FIG. 7 illustrates a bonding pattern in accordance with the first embodiment of the invention. According to such a bonding pattern, the bonding portion 90 is not formed on the entire surface of the bipolar battery stack 40, but is rather formed at a part or some points of the bipolar battery stack. Variations 1 to 3 show specific disposition patterns.

According to Variation 1 in FIG. 7, the bonding portion 90 is formed with a rectangle having a predetermined size and is optionally disposed at a plurality of positions of the surface of the bipolar battery stack 40. Although a shape of the bonding portion is rectangular, the invention is not limited to such a configuration. Rather, embodiments of the invention may include any shape such as polygon and the like.

According to Variation 2 in FIG. 7, the bonding portion is formed with a dot shape and is optionally disposed at a plurality of positions on the surface of the bipolar battery stack 40.

According to Variation 3 in FIG. 7, the bonding portion is formed with a line having a predetermined length and thickness. It is disposed on the surface of the bipolar battery stack 40 with a continuous width.

Since the bonding portion 90 is formed as shown in FIG. 7, it is possible to prevent a resistance increase resulting from displacement. Further, since the weight and capacity are reduced, it is possible to improve the output density.

A basic structure of the bipolar battery 10 in accordance with a second embodiment of the present invention is identical to the first embodiment explained in view of FIGS. 1 to 6.

Thus, explanations thereof are omitted. The first embodiment differs from the second embodiment only in terms of a bonding pattern for bonding the bipolar battery stacks 40 to each other and bonding the battery stack 40 and the electrode tabs 50 and 60.

Figure 8:
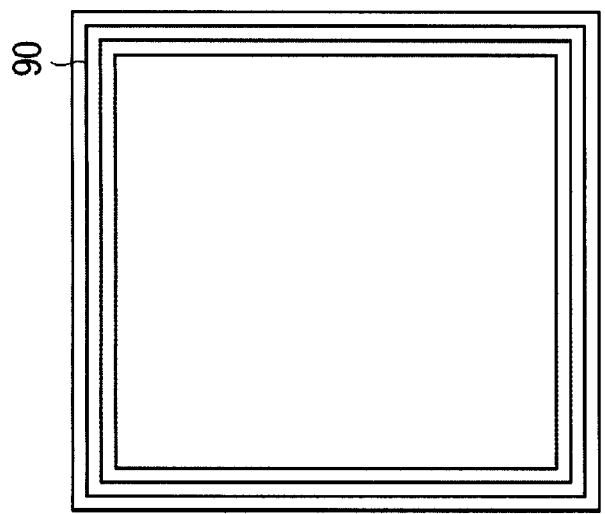
FIG. 8 shows a bonding pattern in accordance with a second embodiment of the invention.
Figure 8:
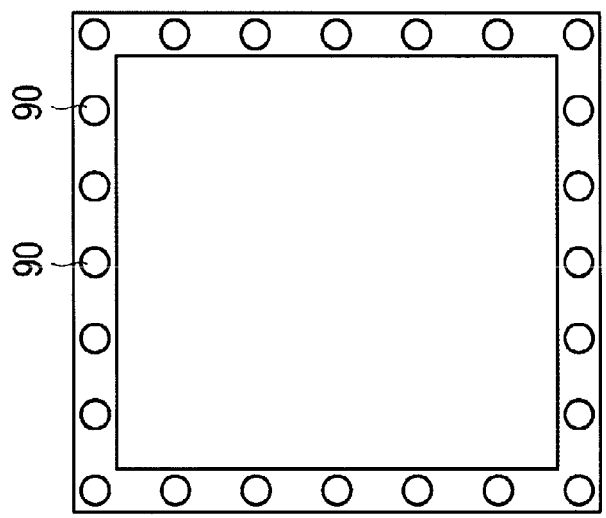
Figure 8:
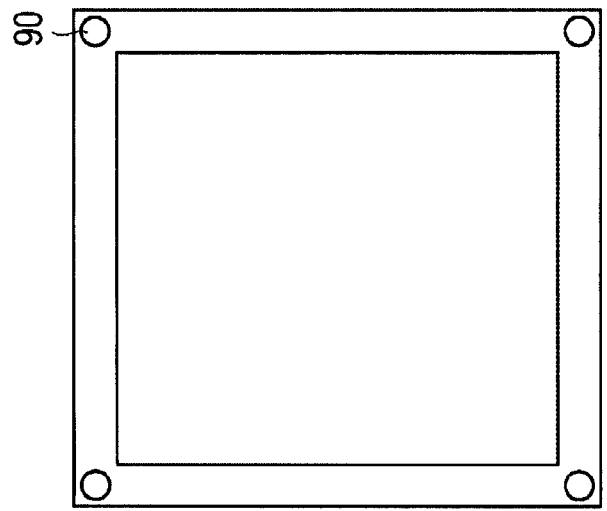

FIG. 8 shows a bonding pattern in accordance with the second embodiment. According to this bonding pattern, the bonding portion 90 is formed at the sealing portion near the edge of the battery stack 40, not at the battery reacting portion. Variations 1 to 3 show specific disposition patterns.

According to Variation 1 in FIG. 8, the bonding portion with a predetermined size is disposed at four corners on the sealing portion.

According to Variation 2 in FIG. 8, the bonding portion with a predetermined size is disposed in a plurality of positions while maintaining a constant interval. Although the bonding portion is disposed with a constant spacing therebetween according to Variation 2, the invention is not limited to this configuration. Rather, the bonding portion may be disposed in any spacing. It is preferred that the bonding portions 90 do not affect the mechanical balance properties of the battery stack. As such, one desirable embodiment exists wherein the bonding portions are arranged at a centroid axis A of the battery stack. Centroid axis refers to an axis aligned along the direction of stacking in the battery stack that intersects the centroid or center of mass of the battery stack (see FIG. 1A). In the case of the FIG. 8, the centroid axis A (see FIG. 9) extends from the center of the square shaped end surface through the battery stack. The anti-vibration property is improved since a centroid axis A of these bonding portions aligns with a centroid axis A of the bipolar battery stack 40.

According to Variation 3 in FIG. 8, one bonding portion 90 with a continuous geometry having a predetermined thickness is disposed around an entire periphery of the sealing portion. As shown, the bonding portion 90 has a single loop around the periphery of the sealing portion. However, the invention is not limited to this configuration, but may have a plurality of loops. Further, the bonding portion 90 may be a dashed loop, or other non-continuous geometry, instead of a continuous geometry.

Since a bonding portion is not located in the battery reacting portion, as shown in FIG. 8, the electrical resistance is not increased while improving the vibration performance. Thus, a bipolar second battery with a high output density can be obtained.

A basic structure of the bipolar battery 10 in accordance with a third embodiment of the invention is identical to the first embodiment explained in light of FIGS. 1 to 6. Thus, explanations thereof are omitted. The first embodiment differs from the third embodiment only in terms of a bonding pattern for bonding the bipolar battery stacks 40 to each other and for bonding the battery stack 40 and the electrode tabs 50 and 60.

Figure 9:
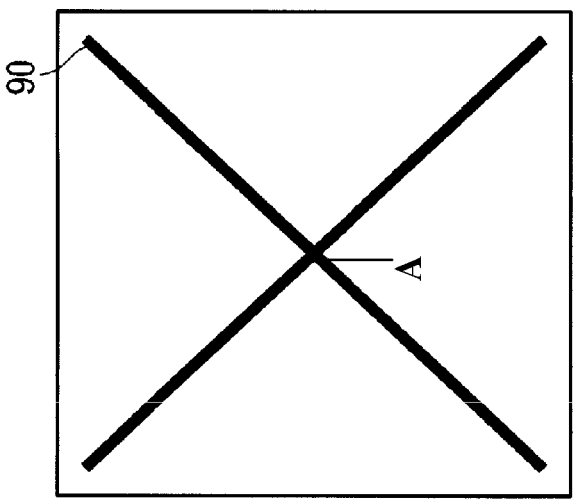
FIG. 9 shows a bonding pattern in accordance with a third embodiment of the invention.
Figure 9:
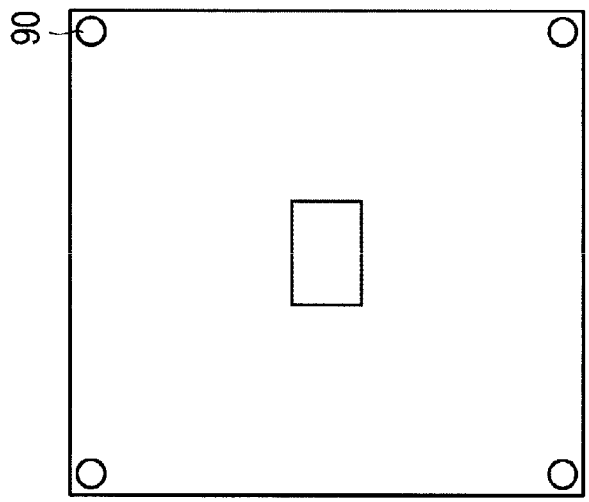
Figure 9:
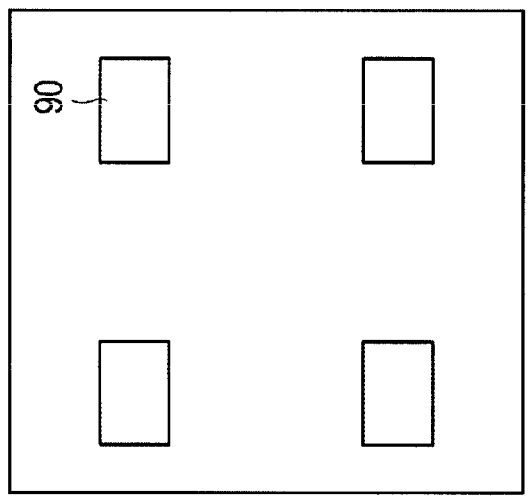

FIG. 9 shows a bonding pattern 90 in accordance with the third embodiment. According to this bonding pattern, the centroid axis A on the corresponding contact surface of the bonding portion 90 formed on the contact surface of the bipolar battery stack 40 conforms to the centroid axis A of the bipolar battery stack 40 (see FIG. 1A). Variations 1 to 3 show specific disposition patterns.

According to Variation 1 in FIG. 9, the bonding portion 90 is formed as a plurality of rectangles of a predetermined size arranged such that the centroid axis A of bonding portions 90 are aligned with the centroid axis A of the bipolar battery stack. Although a shape of the bonding portion is a rectangular, the invention is not limited to this configuration. Rather, the bonding portions may have any shape such as polygon, etc. Alternatively, the bonding portions 90 may be similar to Variation 2, wherein a bonding portion 90 is located at the centroid axis A of the bipolar battery stack 40 with a plurality of bonding portions 90 spaced apart from the centroid axis A of the bipolar battery stack, but still having a combined centroid axis A corresponding to the centroid axis A of the bipolar battery stack 40 as shown in FIG. 9. Alternatively, any combination of shapes, including polygons, may be used in with Variation 2 and not depart from the scope of the invention.

According to Variation 3 in FIG. 9, two bonding portions 90 having a linear shape and a predetermined length and thickness are formed in diagonal directions of the contact surface. The bonding portions 90 are arranged such that the centroid axis A of the bonding portions aligns with the centroid axis A of the bipolar battery stack. Here, although the bonding portion 90 is disposed at two points on the diagonal line, the invention is not limited to this configuration. Rather, a plurality of the bonding portions having a linear shape may be disposed in a predetermined position as long as the centroid axis A of the bipolar battery stack aligns with the centroid axis A of the bonding portion 90.

When the bonding portion 90 is formed as shown in FIG. 9, since the centroid axis position of the contact surface conforms to the center position of the bipolar battery stack 40, anti-vibration performance is improved. Further, since the bonding points are minimal, the amount adhesive used may be small and the weight and volume are decreased to thereby improve the output density.

A basic structure of the bipolar battery 10 in accordance with a fourth embodiment of the invention is identical to the first embodiment explained in view of FIGS. 1 to 6. Thus, explanations thereof are omitted herein. The first embodiment differs from the fourth embodiment only in terms of a bonding pattern for bonding the bipolar battery stacks 40 to each other and for bonding the battery stack 40 and the electrode tabs 50 and 60.

Figure 10:
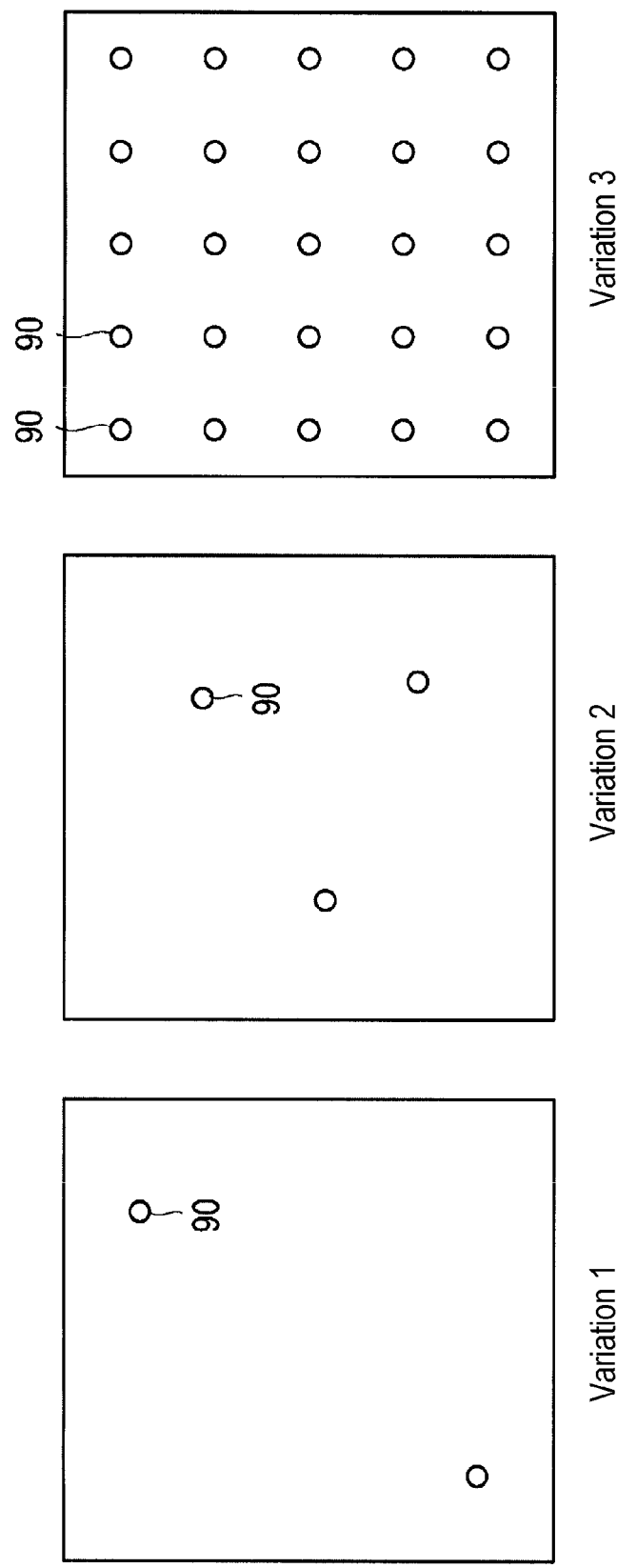
FIG. 10 shows a bonding pattern in accordance with a fourth embodiment of the invention.

FIG. 10 shows a bonding pattern in accordance with the fourth embodiment. According to this bonding pattern, the bonding portion of the bipolar battery stack 40 is formed with a plurality of dot shapes.

According to Variation 1 in FIG. 10, the bonding portion 90 with the dot shapes are formed at two points along a diagonal line of the contact surface with respect to a center of the contact surface. As such, displacement between the bipolar battery stacks 40 or between the bipolar battery stack 40 and the electrode tabs 50 and 60 can be prevented only by forming two bonding portions having dot shapes.

According to Variation 2 in FIG. 10, the bonding portion 90 with the dot shape is formed at three points with respect to the center of the contact surface targeted to the dot. As such, a position displacement in a direction of rotating on the surface can be effectively prevented by forming three bonding portions with the dot shape.

According to Variation 3 in FIG. 10, the bonding portion 90 with the dot shape is formed at the contact surface with a constant spacing therebetween. As such, a secure adhesive force can be obtained. Position displacement between the bipolar battery stacks 40 and between the bipolar battery stack 40 and the electrode tabs 50 and 60 can be prevented.

The displacement in a rotational direction is prevented by forming the bonding portion 90 as shown in FIG. 10, while minimizing a weight increase and current inhibition. A resistance increase is thus prevented.

In addition to the adhesive as in the sealing portion, an adhesive with conductivity may be used for the bonding portion 90 explained in the first to fourth embodiments. The adhesive with conductivity may include, for example, Ag, Au, Cu, Al metallic, SUS, Ti and carbon. It is particularly effective when the bonding portion is disposed in a portion contributing to the battery reaction with respect to the contact surface of the bipolar battery stack 40. If the adhesive has conductivity, then the bonding portion has electrical conductivity. As such, it becomes possible to prevent a resistance increase.

Thus, if the bonding portion has conductivity, then the contact resistance is reduced to thereby increase the output density of the battery. Further, the vibration performance is improved.

The first to fourth embodiments are provided to explain the bipolar secondary battery. The fifth embodiment of the invention is described below to explain a battery assembly formed by connecting the bipolar secondary batteries described in the first to fourth embodiments.

Figure 11C:
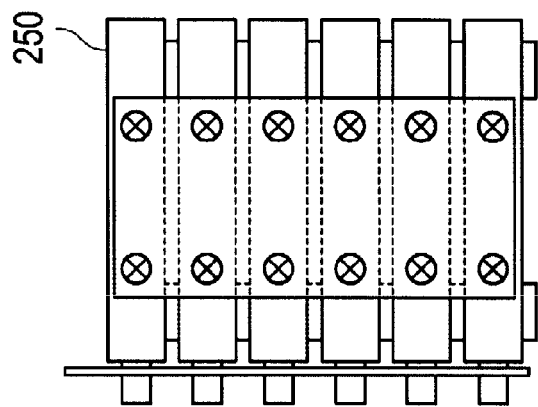
FIGS. 11A to 11C shows a battery assembly in accordance with a fifth embodiment of the invention.
Figure 11A:
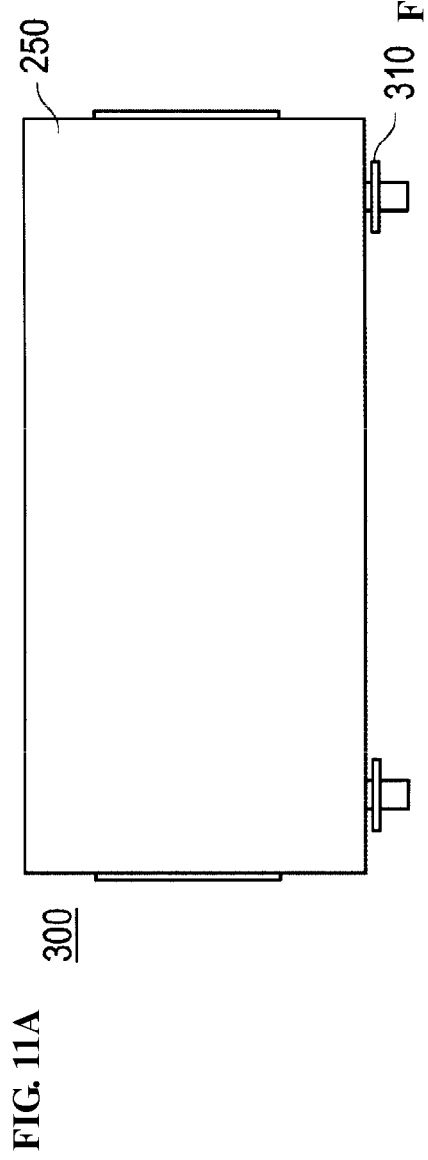
Figure 11B:
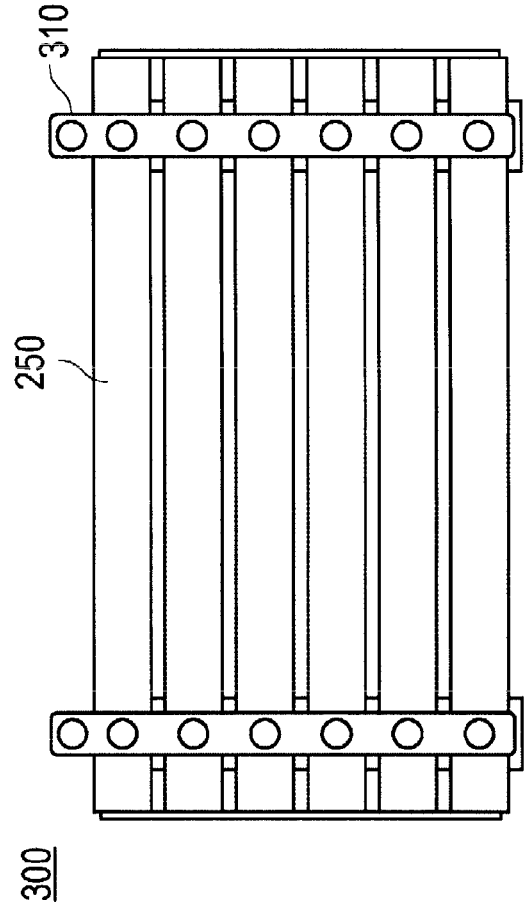

A battery assembly 250 (see FIGS. 11A to 11C) may be formed by connecting a plurality of the bipolar secondary batteries 10 explained above in series or in parallel. A plurality of battery assemblies 300 may be formed by connecting the battery assemblies 250 in series or in parallel. A plurality of the bipolar secondary batteries 10 is stacked and housed within a case, and each bipolar secondary battery 10 is connected in parallel to thereby form the battery assembly 250 shown in FIG. 11. A bus bar at the cathode side or anode side is connected to each connecting hole via a conductive bar. FIG. 11A shows a planar view of a plurality of the battery assemblies 300 in accordance with the fifth embodiment. FIG. 11B shows a front view thereof, and FIG. 11C shows a side view thereof. The prepared battery assembly 250 is interconnected to another by using an electrical connecting means such as the bus bar, and the battery assembly is stacked in multiple layers by using a connecting jig 310. The capacity or output of the vehicle (electric vehicle) mounting the battery assembly determines how many bipolar secondary batteries 10 are connected to form the battery assembly 250 and how many layers of the battery assembly 250 are used to form a plurality of the battery assemblies 300.

According to the fifth embodiment, a battery, which can freely adjust the capacity and output, can be manufactured by connecting the bipolar secondary batteries 10 in series, in parallel or in a combination thereof. Further, each bipolar secondary battery 10 using the bipolar battery stack 40 has a configuration with the advantage of the bipolar battery stack 40 wherein the current flows along the stacking direction in battery element 10. Also, since it is easy to form the bipolar secondary battery 10, it becomes easy to form a plurality of the battery assemblies formed by electrically connecting a plurality of the bipolar secondary batteries 10. Further, since the bipolar secondary battery has long life span and high reliability, the battery assemblies also have long life span and high reliability. Also, in the event that a part of the battery assemblies 250 is broken, it can be fixed by replacing the broken part.

A sixth embodiment of the invention is provided to explain a vehicle mounting the bipolar secondary battery 10 described in the first to fourth embodiments or a plurality of the battery assemblies 300 described in the fifth embodiment.

Figure 12:
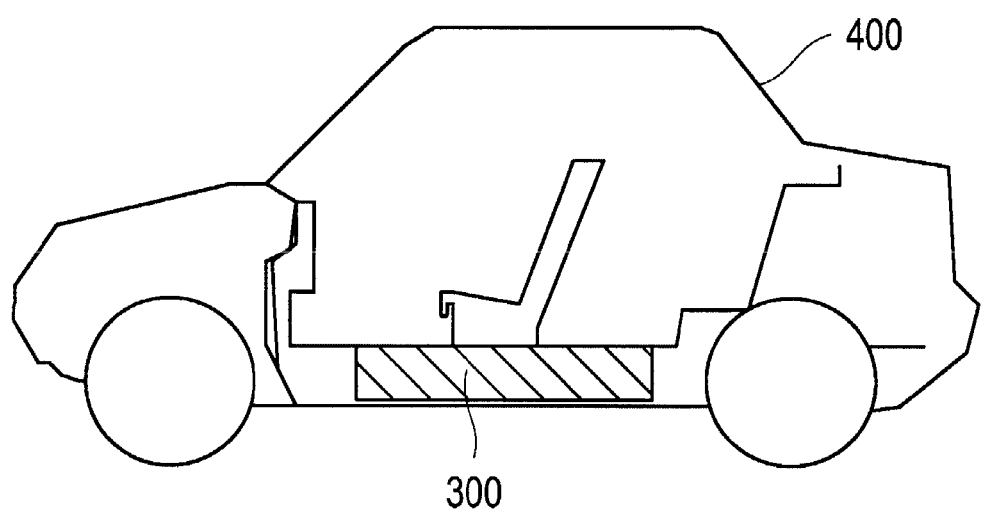
FIG. 12 shows a vehicle in accordance with a sixth embodiment of the present invention.

FIG. 12 shows a vehicle 400 mounting the bipolar secondary battery and the battery assembly connecting a plurality of the bipolar secondary batteries in accordance with the invention. The bipolar secondary battery 10 and a plurality of the battery assemblies 300 are mounted on the vehicles such as an automobile or electric railway, thereby being used as a power source for driving electrical devices such as a motor. As described above, since it is easy to form the bipolar secondary battery 10 and a plurality of the battery assemblies 300, it is easy to form the power source.

To mount the battery assemblies 300 on the vehicle 400, the battery assemblies 300 are amounted under a seat at a vehicular body central portion of the vehicle 400 as shown in FIG. 12. This mounting allows a vehicular inner space and a trunk room to be widely occupied. Further, a place for mounting the battery assemblies 300 is not limited to under the seat, but may be a lower portion of a rear portion trunk room or an engine room at a front of the vehicle. Since the battery assemblies 300 are used for a vehicle 400 such as a hybrid vehicle, an electric vehicle and a fuel cell vehicle, it is possible to provide a vehicle with high reliability having high durability and sufficient output despite long-term use. Further, it is possible to provide the vehicle 400 with excellent fuel economy and driving performance.

Further, in certain embodiments of the invention, in addition to the battery assemblies 300, only the battery assembly 250 shown in FIG. 11 or only the bipolar secondary battery 10 shown in FIG. 1A may be mounted, or a combination of the battery assemblies 300, the battery assembly 250 and the bipolar secondary battery 10 may be mounted depending on the usage. Also, the vehicle capable of mounting the battery assembly of the invention preferably includes a hybrid vehicle, an electric vehicle and a fuel cell vehicle, although the invention is not limited to this configuration.

EXAMPLES

The bipolar secondary batteries explained in the first to fourth embodiments are manufactured. Evaluation items includes a weight of the bipolar secondary battery, a ratio of retaining capacity, a resistance and a resistance increase ratio in each battery before and after charging/discharging and exerting a thermal vibration. The bipolar secondary battery in accordance with the examples and a method of manufacturing the same are explained in detail based on the examples, although the invention is not limited thereto.

First described in production of the bipolar battery element.

A SUS foil with a thickness of 20 μm is used as the collector.

In order to form the cathode at one surface on the collector, the cathode active material, a conductive auxiliary agent, acetylene black and a binder are mixed with a predetermined ratio to thereby prepare a cathode slurry. Here, 85 wt % $LiMn_2O_4$ as the cathode active material, 5 wt % acetylene black as the conductive auxiliary agent and 10 wt % PVDF as the binder are used. NMP as a slurry viscosity adjusting solvent is added to an applying process until it becomes an optimum viscosity to thereby prepare the cathode slurry. The cathode slurry is applied to one surface of the SUS foil (thickness: 20 μm), which is the collector, and is then dried to thereby prepare the cathode having a 30 μm thick electrode layer.

In order to form the anode at the other surface on the collector opposite to the cathode, the anode active material and a binder are mixed at a predetermined ratio to thereby prepare an anode slurry. Here, 90 wt % hard carbon as the anode active material and 10 wt % PVDF as the binder are used. NMP as the slurry viscosity adjusting solvent is added to an applying process until it becomes an optimum viscosity to thereby prepare the anode slurry. The anode slurry is applied to a surface of the SUS foil opposite to the surface where the cathode is applied. The combination is then dried to thereby prepare the anode having a 30 μm thick electrode layer.

The cathode and the anode are formed on both surfaces of the SUS foil (collector) to thereby prepare the bipolar electrode.

This bipolar electrode is 160×130 mm, and the outer peripheries of the cathode and the anode are separated by 10 mm to thereby expose the surface of the SUS foil (collector). By doing so, the bipolar electrode is prepared wherein the electrode surfaces of the cathode and the anode are 140×110 mm (see FIG. 3).

Next discussed is the preparation of the electrolyte layer. To allow the bipolar electrode to be the battery element by stacking the bipolar electrodes, the electrolyte layer is formed on the electrode surfaces of the cathode and the anode of the bipolar electrode. In order to prepare the electrolyte layer, an electrolytic solution and a host polymer are mixed at a predetermined ratio to thereby prepare an electrolyte material. Then, 1M of $LiPF_6$, 90 wt % of the electrolytic solution and 10 wt % of a PVDF-HFP copolymer containing 10% HFP-polymer as the host polymer are used. DMC as a viscosity adjusting solvent is added to the applying process until it becomes an optimum viscosity to thereby prepare a pre-gel electrolyte. This pre-gel electrolyte is applied to the electrode portions of the cathode and the anode on the opposite sides of the collector, followed by drying DMC, thus completing the manufacture of the bipolar electrode where the gel electrolyte is permeated.

Preparation of the seal precursor next occurs. As shown in FIG. 5, by using a dispenser, the seal precursor (1-liquid uncured epoxy resin) is applied to the outer peripheral portion of the bipolar electrode where a vicinity of the cathode is not applied with the electrode.

Next, a 170×140 mm separator (polyethylene separator: 12 μm) is disposed at the cathode side so as to cover the entire SUS foil (collector).

Then, as shown in FIG. 6, by using the dispenser, the seal precursor (1-liquid uncured epoxy resin) is applied to the outer peripheral portion of the bipolar electrode where the separator is not applied with the electrode (the same portion where the sealing material is applied).

Six sheets of the bipolar electrode manufactured as above are overlapped to prepare the bipolar battery structure where the unit cell layers are stacked in five layers.

The bipolar battery structure is pressed by heat using a heat presser with a surface pressure of 1 kg/cm² at 80° C. for an hour to thereby cure the sealing portion (epoxy resin). By such a process, it becomes possible to press or cure the sealing portion to a predetermined thickness (see FIG. 2). Thus, the bipolar battery stack where the unit cell layers are stacked in five layers is completed.

First Example

Four bipolar battery stacks manufactured as above are overlapped so as to be electrically connected in series. Then, an aluminum tab for outputting the current is clamped to respective ends thereof, and the stacks are vacuum-sealed using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 1 in FIG. 7 to thereby prepare the bonding portion.

Second Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 2 in FIG. 7 to thereby prepare the bonding portion.

Third Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 3 in FIG. 7 to thereby prepare the bonding portion.

Fourth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 1 in FIG. 9 to thereby prepare the bonding portion.

Fifth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 2 in FIG. 9 to thereby prepare the bonding portion.

Sixth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 3 in FIG. 9 to thereby prepare the bonding portion.

Seventh Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 1 in FIG. 10 to thereby prepare the bonding portion.

Eighth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 2 in FIG. 10 to thereby prepare the bonding portion.

Ninth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 3 in FIG. 10 to thereby prepare the bonding portion.

Tenth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy is paste dispersing type) is coated between the bipolar battery stacks and between the current outputting tab and the bipolar battery stack by the dispenser as in the same arrangement of Variation 3 in FIG. 10 to thereby prepare the bonding portion.

Eleventh Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 1 in FIG. 8 to thereby prepare the bonding portion.

Twelfth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 2 in FIG. 8 to thereby prepare the bonding portion.

Thirteenth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks and between the current outputting tab and the bipolar battery stack by the dispenser as in the same arrangement of Variation 3 in FIG. 8 to thereby prepare the bonding portion.

Fourteenth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the bipolar battery stacks by the dispenser as in the same arrangement of Variation 1 in FIG. 7 to thereby prepare the bonding portion.

Fifteenth Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, the adhesive (room temperature curing 2-liquid mixed type epoxy) is coated between the current outputting tab and the bipolar battery stack by the dispenser as in the same arrangement of Variation 1 in FIG. 7 to thereby prepare the bonding portion.

First Comparative Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. Unlike the first to thirteen examples, the bonding process is not performed between the bipolar battery stacks or between the current outputting tab and the bipolar battery stack.

Second Comparative Example

Four bipolar battery stacks manufactured as above are overlapped so as to be electrically connected in series. Then, an aluminum tab for outputting the current is clamped to respective ends thereof, and the stacks are vacuum-sealed by using an aluminum laminate as an outer material to thereby manufacture the bipolar secondary battery where the unit cell layers are in series. At this time, an elastic body is inserted between the bipolar battery stacks and between the current outputting tab and the bipolar battery stack. The elastic body is a conductive polymer material. The conductive polymer material is prepared by dispersing a carbon material as conductive filler into polypropylene.

(Evaluation)

A charge-discharge testing is performed with respect to each battery of the first to thirteenth examples and the first and second comparative examples. For the test, each battery is charged at a constant current (CC) of 0.5 mA up to 84 V and then charged at a constant voltage (CV) for ten hours. Thereafter, the vibration (24.5 m/s$^2$ of input acceleration and 10 to 100 Hz of vibration is constantly exerted) and heat cycle (one cycle means one hour at 25° C. and one hour at 60° C.) is exerted to each battery for two weeks. Then, each battery is discharged, and a capacity of the bipolar secondary battery is checked. The result of the discharging capacity after exerting the vibration when the capacity before exerting the vibration is 100% is indicated in Table 1 below. Note that charging and discharging operations are performed by the constant current charge/discharge and the full charge is 84V and the discharge end is 50V.

TABLE 1

| | Capacity retaining ratio after vibration (before 100%) |
|---|---|
| First Example | 92% |
| Second Example | 93% |
| Third Example | 94% |
| Fourth Example | 95% |
| Fifth Example | 96% |
| Sixth Example | 94% |
| Seventh Example | 94% |
| Eighth Example | 95% |
| Ninth Example | 94% |
| Tenth Example | 96% |
| Eleventh Example | 94% |
| Twelfth Example | 95% |
| Thirteenth Example | 94% |
| Fourteenth Example | 96% |
| Fifteenth Example | 94% |
| First Comparative Example | cannot be measured due to the voltage decrease |
| Second Comparative Example | 93% |

Further, the inner resistance of each battery before and after exerting the vibration is measured. The inner resistance of each battery is measured by an AC impedance measurement with a frequency of 1 kHz, and is shown in Table 2 below.

TABLE 2

| | Initial resistance before vibration |
|---|---|
| First Example | 105% |
| Second Example | 105% |
| Third Example | 104% |
| Fourth Example | 104% |
| Fifth Example | 104% |
| Sixth Example | 105% |
| Seventh Example | 104% |
| Eighth Example | 103% |
| Ninth Example | 102% |
| Tenth Example | 100% |
| Eleventh Example | 100% |
| Twelfth Example | 100% |
| Thirteenth Example | 100% |
| Fourteenth Example | 104% |
| Fifteenth Example | 102% |
| First Comparative Example | 100% |
| Second Comparative Example | 101% |

The resistance of each battery when an initial resistance of the battery of the first comparative example before exerting the vibration is 100% is indicated in Table 3 below.

TABLE 3

| | Resistance increase ratio after vibration (before 100%) |
|---|---|
| First Example | 131% |
| Second Example | 130% |
| Third Example | 130% |
| Fourth Example | 119% |
| Fifth Example | 118% |
| Sixth Example | 119% |
| Seventh Example | 117% |
| Eighth Example | 118% |
| Ninth Example | 118% |
| Tenth Example | 117% |
| Eleventh Example | 117% |
| Twelfth Example | 118% |
| Thirteenth Example | 117% |
| Fourteenth Example | 136% |
| Fifteenth Example | 140% |
| First Comparative Example | cannot be measured due to the voltage decrease |
| Second Comparative Example | 156% |

The weight of each battery when the weight of the battery of the second comparative example is 100% is indicated in Table 4 below.

TABLE 4

| | Battery weight (Second Comparative Example is 100%) |
|---|---|
| First Example | 95% |
| Second Example | 94% |
| Third Example | 95% |
| Fourth Example | 94% |
| Fifth Example | 93% |
| Sixth Example | 92% |
| Seventh Example | 87% |
| Eighth Example | 87% |
| Ninth Example | 89% |
| Tenth Example | 89% |
| Eleventh Example | 89% |
| Twelfth Example | 92% |
| Thirteenth Example | 93% |
| Fourteenth Example | 94% |
| Fifteenth Example | 92% |
| First Comparative Example | 87% |
| Second Comparative Example | 100% |

Upon comparing the first comparative example with the first to thirteenth examples, although the battery is lighter since there is no adhesive and elastic body, there is no voltage after exerting the vibration. Further, it became apparent that the anti-vibration performance in the battery of the first comparative example is extremely poor. When the bipolar secondary battery of the first comparative example is released, there is a displacement between the bipolar battery stacks and between the bipolar battery and the current outputting tab. From the above, it became apparent that the examples of the invention increase anti-vibration performance.

Further, upon comparing the second comparative example with the first to thirteenth examples, the resistance of the bipolar secondary battery after the vibration is greatly increased in the second comparative example. Similar to the first comparative example, when the bipolar secondary battery is released, displacement occurred between the bipolar battery stacks and between the bipolar battery and the current outputting tab after exerting the vibration.

Although a specific mechanism is not clear, it is understood that such a displacement causes resistance increase. Thus, the anti-resistance performance is increased by adhering and bonding the bipolar battery stacks to each other and/or by adhering and bonding the bipolar battery stack and the current outputting tab as taught herein. Further, even upon comparing the weight of the bipolar battery, it has been noted that a battery of the invention is light since the adhering and bonding portion is not required over the entire surface but can also involve only a part thereof.

Upon comparing the first to third examples with the fourth to thirteenth examples, the resistance increase after exerting the vibration in the first to third examples is greater. Without being bound by theory, this appears to be because the anti-vibration effect is increased due to the conformance of the center of positions of the bipolar battery stack and the bonding portion to each other. The anti-vibration effect in the fourth to thirteenth examples is higher.

Upon comparing the first to sixth examples with the seventh to ninth examples, the battery weight in the first to sixth examples is heavier. From this, it becomes apparent that the battery weight is reduced by allowing the bonding portions to be dots and fixing them at two or more points, while still retaining the anti-vibration effect.

Upon comparing the first to ninth examples with the tenth example, the initial resistance of the battery in the tenth example is lower. In particular, when the ninth example is compared with the tenth example, although the position of the bonding portion is not changed, the initial resistance of the battery in the tenth example is lower. It is believed that this is due to the fact that since the adhesive used in the bonding portion has a conductive property, it becomes possible to suppress the resistance increase of the bonding portion.

Upon comparing the first to sixth examples with the eleventh to thirteenth examples, the initial resistance in the eleventh to thirteenth examples is lower. The initial resistance in the eleventh to thirteenth examples is equal to that in the first comparative example. From this, it is noted that when the adhesive is arranged in a part irrelevant to the battery reaction (i.e., sealing portion), a battery with a high anti-vibration property is obtained without increasing the contact resistance of the battery.

Upon comparing the fourteenth and fifteenth examples with the second comparative example in view of the resistance increase ratio, it is noted that the resistance increase ratios in the fourteenth and fifteenth examples are lower. Further, the anti-vibration effect is achieved only between the bipolar battery stacks or only between the current outputting tab and the bipolar battery stack.

Embodiments of the invention may be used for manufacturing a bipolar secondary battery suitable for an environment with vibration.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A bipolar secondary battery, comprising:
at least one bipolar battery stack, each including at least one electrolyte layer and a plurality of bipolar electrodes alternately stacked with the at least one electrolyte layer, each bipolar electrode comprising a cathode formed at a first side of a collector and an anode formed at an opposite side of the collector, and further including an end collector at each end of the bipolar battery stack having a first surface stacked on outermost bipolar electrode at a respective end of the bipolar battery stack and a contact surface facing opposite the bipolar battery stack; and
an electrode tab disposed at opposing ends of the bipolar battery stack in a stacking direction of the bipolar battery stack, each electrode tab having a contact surface and an opposing surface;
wherein the contact surface of each electrode tab is fixedly bonded to the contact surface of a respective end collector of the bipolar battery stack at a bonding portion such that the bipolar battery stack is disposed between electrode tabs in the stacking direction with the opposing surface of each electrode tab forming an outermost layer of the bipolar battery stack.

2. The bipolar secondary battery of claim 1, wherein the at least one bipolar battery stack comprises a plurality of bipolar battery stacks layered in the stacking direction between the respective electrode tabs such that the contact surface of the end collector of a bipolar battery stack contacts the contact surface of the end collector of an adjacent bipolar battery stack; and wherein the end collectors of adjacent bipolar battery stacks are fixedly bonded to each other at a bonding portion disposed between the contact surfaces of the end collectors of the adjacent bipolar battery stacks.

3. The bipolar secondary battery of claim 1, wherein the bonding portion is configured such that a resulting centroid axis is aligned with a centroid axis of the bipolar battery stack.

4. The bipolar secondary battery of claim 3, wherein the bonding portion includes a two-dimensional array of contact points.

5. The bipolar secondary battery of claim 1, wherein the bonding portion has a dot shape at two or more points.

6. The bipolar secondary battery of claim 5, wherein the dot shape includes a two-dimensional array of contact points.

7. The bipolar secondary battery of claim 5, wherein spacing between adjacent contact points of the two-dimensional array of contact points is about equal.

8. The bipolar secondary battery of claim 1, wherein the bonding portion includes a conductive adhesive.

9. The bipolar secondary battery of claim 1, wherein the electrolyte is a solid electrolyte.

10. The bipolar secondary battery of claim 1, wherein an active material of the cathode comprises a lithium-transition metal composite oxide, and wherein an active material of the anode comprises a lithium-transition metal composite oxide or carbon.

11. A battery assembly formed by electrically connecting a plurality of the bipolar secondary batteries of claim 1.

12. A vehicle comprising the bipolar secondary battery of claim 1 mounted therein to provide a power source for vehicle movement.

13. The bipolar secondary battery of claim 2, wherein the bonding portion includes a conductive adhesive.

14. The bipolar secondary battery of claim 13, wherein the bonding portion includes a two-dimensional array of dots of the conductive adhesive.

15. The bipolar secondary battery of claim 14, wherein the two-dimensional array of dots forms a centroid axis aligned with a centroid axis of the bipolar battery stack.

* * * * *